INVENTOR.
BENGT ARNE PALM

United States Patent Office 3,359,062
Patented Dec. 19, 1967

3,359,062
METHOD FOR STERILIZING THE FILLING PIPE OF A FILLING MACHINE
Bengt Arne Palm, Nylyckevagen, Genarp, Sweden, assignor to Aktiebolaget Separator, Stockholm, Sweden, a corporation of Sweden
Filed Jan. 10, 1964, Ser. No. 336,923
Claims priority, application Sweden, Jan. 14, 1963, 396/63
6 Claims. (Cl. 21—56)

ABSTRACT OF THE DISCLOSURE

A filling pipe has in its open end a valve which, when seated, allows only slight discharge from the pipe; and the filling pipe has its other end connected to sources of (1) a liquid to be filled into vessels presented to the filling pipe, (2) water maintained in a liquid state at a temperature above 100° C., and (3) a hot sterilizing medium. With the valve in the open end of the filling pipe unseated, liquid is passed from the source of liquid to be filled into the vessels through the filling pipe and into such vessels; and when this filling operation is completed, water is passed from the aforementioned water source through the filling pipe (while the valve is unseated) to generate steam in the pipe and thereby flush the pipe clean. Thereafter, the valve in the open end of the pipe is seated and hot sterilizing medium is passed from the source of such medium through the filling pipe, resulting in slight discharge of the hot sterilizing medium from the open end of the pipe and sterilization of the pipe.

The disclosure

Figure 1:
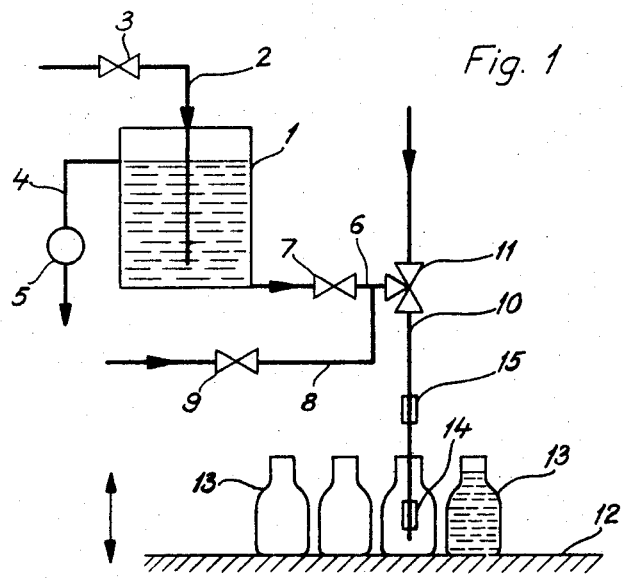

The present invention relates to a method for sterilizing the filling pipe of a filling machine in which a liquid is filled into bottles, plastic containers or other vessels.

In such a filling operation, it is of great importance that the interior of the vessels be sterile immediately before the filling starts and that the sterility be maintained while the filling goes on. This is particularly true when pasteurized or sterilized milk is to be filled in the vessels, since such milk is an excellent growth medium for bacteria. The vessels which are to be filled with such milk should, therefore, always be sterilized immediately before the filling starts and the sterility should be maintained during the entire filling operation. This prevents noxious bacteria from being present in the vessels or penetrating into them before or during the filling. Such sterilization of the vessels is generally carried out immediately before as well as during the filling, by means of powerful heating elements which are inserted into the vessels together with the filling pipe of the filling machine.

These powerful heating elements give off much heat, even to the filling pipe. Consequently, liquid residues (especially milk residues) remaining in the filling pipe easily burn on the latter if the filling is interrupted for any reason, as due to insufficient heating of the liquid before the filling. This burning-on of residues in the filling pipe causes rather extensive clogging of the pipe and often gives rise to strong taste alterations of the liquid which is to be subsequently processed in the filling machine, if the filling pipe of the machine is not carefully cleaned before the filling is resumed.

In the method of the present invention, the filling pipe is flushed in a special manner immediately after the machine has been stopped, whereby such burning-on in the pipe is entirely eliminated.

According to the present invention, liquid residues remaining in the filling pipe upon termination of a filling operation are rapidly and efficiently flushed out of the pipe by means of a fast-flowing surge of a steam and water mixture. This mixture is obtained by feeding water of a higher temperature than 100° C., preferably 130° C. or more, to the filling pipe while the outlet of the latter is kept open. The water thus fed forms the steam-water mixture due to the pressure drop in the pipe and to the corresponding steam generation and temperature drop (down to about 100° C.). Before the filling through the pipe is resumed, the pipe is sterilized by causing a hot medium to pass through it. This is preferably done by means of hot water or steam, or both, while the outlet of the pipe is kept throttled. In this process, the pipe is to be heated up to a temperature of 130° C. or more. The sterility of the pipe is maintained, until the filling is resumed, by means of hot air which likewise should have a temperature of 130° C. or more and which is blown through the pipe. To ensure that the sterility thus achieved is not jeopardized, the valves of the filling machine are preferably operated automatically and with the required simultaneity so that no infection possibilities may arise.

The method of the invention may be used to particular advantage when filling liquids containing an organic substance since the latter often constitutes a favorable growth substratum for bacteria. It is of special importance to flush residues of such a liquid from the filling pipe immediately after an interruption of the filling in cases where the pipe, upon completion of the filling, is subjected to the action of heat, since an organic substance would otherwise burn on the pipe interior and become difficult to flush off. Such heat is generated by the aforementioned heating elements used for sterilizing the vessels in which the liquid is to be filled.

Figure 2:
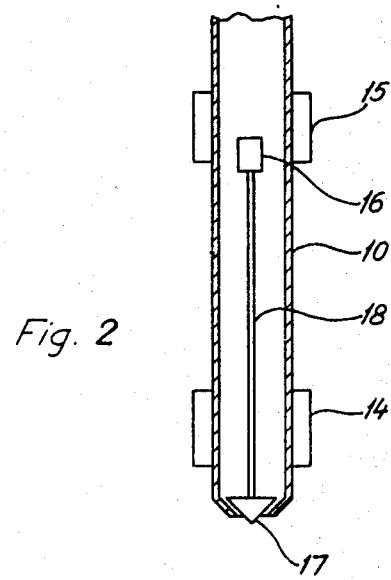

The invention is described more in detail below, reference being made to the attached drawing in which FIG. 1 is a schematic view of an installation for carrying out the new method, and FIG. 2 is an enlarged longitudinal sectional view of the lower portion of the filling pipe shown in FIG. 1.

In the following, a filling operation is assumed in which milk is filled into bottles, although the invention is not limited thereto.

The apparatus shown in FIG. 1 comprises a closed tank 1 in which a quantity of water is kept under a superatmospheric steam pressure of about 2 kg./cm.$^2$. In other words, the water has a temperature of about 130° C. and is thus kept sterile. A pipe 2 provided with a shut-off valve 3 opens into the tank near the bottom. Steam under pressure, which condenses in the water, is admitted through the pipe 2. The surplus of condensation water is discharged at a certain level in the tank through a pipe 4, in which a conventional steam trap 5 is provided. The latter prevents discharge of steam while allowing water to discharge. A pipe 6 provided with a shut-off valve 7 extends from the tank 1. Another pipe 8 for the supply of air at sterilization temperature discharges into the pipe 6. The pipe 8 is provided with a shut-off valve 9.

The filling pipe of the filling machine is designated by reference numeral 10 and is provided with a three-way valve 11 to which the pipe 6 is connected. The filling machine is also provided with a vertically movable table 12 on which is placed a row of bottles 13 in which milk is to be filled. A cylindrical, electrical heating element 14 is fitted around the lower part of the filling pipe 10, and a cylindrical electromagnetic or solenoid coil 15 is fitted around the pipe 1 above heating element 14.

As shown in FIG. 2, solenoid 15 coacts with an iron core 16 connected by a rod 18 to a valve plug 17 in the lower end of pipe 10. With solenoid 15 de-energized, valve 17 is seated in the lower end of pipe 10 and thus allows only slight discharge from this pipe. However, valve 17 is raised upon energizing of solenoid 15, thereby allowing normal discharge from pipe 10.

Assume that the filling pipe 10 has just been sterilized. The valve 11 is set so as to open the pipe 10 and to close the connection to the pipe 6. At the same time the bottom valve 17 in the filling pipe 10 is kept open by the action of the solenoid 15. Milk is supplied through the pipe 10 and at the same time the table 12 is lowered so that the heating element 14 (which, by its heating action, sterilizes the bottle 13 which is filled with milk) will always be located above the milk level in the bottle. After the bottle has been filled and moved aside and a new bottle has been fed into filling position, the table 12 is lifted again so that the pipe 10 and thus the heating element 14 are inserted into the new bottle and the latter is sterilized. Upon interruption of the bottle-filling operation, the valve 11 is actuated to shut off the milk supply and open the connection between the pipe 6 and the pipe 10. At the same time the valve 7 is opened. Water at 130° C. then surges into the pipe 10 where an intense steam generation takes place. The generated steam blows the hot water at a temperature of about 100° C. out through the bottom outlet of the filling pipe 10, the pipe being efficiently flushed clean from milk residues. This bottom outlet is thereafter throttled by de-energizing the solenoid 15 and thus allowing valve plug 17 to seat. Then pipe 10 becomes filled with hot water from the tank 1 and a sterilizing temperature of about 130° C. is maintained in the pipe 10, the seated valve 17 allowing a continual leakage of water through the throttled bottom outlet of the pipe. The faint flow of water thus obtained through the pipe 10 is sufficient to counteract the cooling of the pipe through heat losses. When the pipe 10 has become sterilized, the valve 7 is closed, the bottom outlet of the filling pipe is opened by raising valve 17, and the valve 9 is opened. Air of a temperature of about 130° C. is then supplied to the pipe 10 through the pipe 8 so that the sterility of the pipe 10 is maintained until milk is again to be filled in a new supply of bottles 13. In order to ensure the required sterility, the various valves are preferably operated automatically at the proper times in any conventional manner.

I claim:

1. A method for sterilizing the filling pipe of a filling machine comprising providing an open-ended filling pipe having a valve in its open end which when seated allows only slight discharge from the pipe, said filling pipe having its other end connected to sources of a liquid to be filled into vessels presented to the filling pipe, water maintained in a liquid state at a temperature above 100° C., and a hot sterilizing medium, unseating the valve in the open end of the filling pipe and passing liquid from the source of liquid to be filled into vessels presented to the filling pipe through the filling pipe into such vessels, completing the filling operation, then passing water from the source of water maintained in a liquid state at a temperature above 100° C. through the filling pipe while the valve is unseated to generate steam in the pipe, thereby flushing the pipe clean, thereafter seating the valve in the open end of the pipe and passing hot sterilizing medium from the source of such medium through the filling pipe while the valve is seated, resulting in slight discharge of the hot sterilizing medium from the open end of the pipe and sterilization of the pipe.

2. The method according to claim 1, in which said water is fed into the pipe at a temperature of at least 130° C.

3. The method according to claim 1, in which said sterilizing medium is hot and aqueous.

4. The method according to claim 1, in which said sterilizing medium is hot air.

5. The method according to claim 1, in which said liquid contains an organic substance.

6. The method according to claim 1, in which the filling pipe is subjected to the action of heat upon completion of the filling.

References Cited

UNITED STATES PATENTS

| | | | |
|---|---|---|---|
| 1,276,659 | 8/1918 | Jensen | 134—23 |
| 1,398,503 | 11/1921 | Dunham | 21—56 |
| 2,165,321 | 7/1939 | Wertz | 239—137 X |
| 2,345,614 | 4/1944 | Malsbary et al. | 239—137 X |

FOREIGN PATENTS

| | | |
|---|---|---|
| 831,922 | 4/1960 | Great Britain. |

MICHAEL E. ROGERS, *Primary Examiner.*